United States Patent
Zhu et al.

(10) Patent No.: US 9,894,598 B2
(45) Date of Patent: Feb. 13, 2018

(54) NETWORK OVERRIDE OF DEVICE VOLTE SETTING

(71) Applicant: Verizon Patent and Licensing Inc., Arlington, VA (US)

(72) Inventors: Lily Zhu, Parsippany, NJ (US);
Andrew E. Youtz, Princeton, NJ (US);
Kyriaki Konstantinou, New York, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 125 days.

(21) Appl. No.: 14/928,549

(22) Filed: Oct. 30, 2015

(65) Prior Publication Data

US 2017/0013644 A1    Jan. 12, 2017

Related U.S. Application Data

(60) Provisional application No. 62/190,504, filed on Jul. 9, 2015.

(51) Int. Cl.
*H04W 4/00* (2009.01)
*H04W 48/12* (2009.01)
*H04W 36/00* (2009.01)
*H04W 48/16* (2009.01)

(52) U.S. Cl.
CPC ........ *H04W 48/12* (2013.01); *H04W 36/0022* (2013.01); *H04W 48/16* (2013.01)

(58) Field of Classification Search
CPC .. H04W 48/12; H04W 36/0022; H04W 48/16
USPC .......................................... 370/329
See application file for complete search history.

(56) References Cited

U.S. PATENT DOCUMENTS

| | | | |
|---|---|---|---|
| 9,408,067 B1 * | 8/2016 | Hoadley | |
| 2015/0111556 A1 * | 4/2015 | Hapsari | H04W 8/22 455/418 |

* cited by examiner

*Primary Examiner* — Sai-Ming Chan

(57) ABSTRACT

A method, performed by a device of a wireless access network, includes determining, by the device, that Voice over Long Term Evolution (VoLTE) capability is enabled for a network segment of the wireless access network; designating, by the device, the network segment for VoLTE enforcement; adding, by the device, an indication of VoLTE enforcement to a message information block; and transmitting, by the device, the message information block on the network segment.

20 Claims, 7 Drawing Sheets

NETWORK OVERRIDE OF DEVICE VOLTE SETTING

PRIORITY INFORMATION

This patent application claims benefit of priority to U.S. Provisional Application No. 62/190,504, entitled "NETWORK OVERRIDE OF DEVICE VOLTE SETTING" and filed on Jul. 9, 2015, which is hereby incorporated herein by reference in its entirety.

BACKGROUND INFORMATION

Wireless communication networks continue to evolve. A provider of wireless communication services may have to work with multiple wireless access networks. Different access networks (including home and roaming networks) may be configured with different capabilities. As an example, some wireless access networks may evolve to newer technologies and legacy service may not be available. As another example, a service provider may start new service in a geographical area, but may not offer a legacy service. Thus, the provider of wireless communication services may need to manage different types of wireless access networks in order to provide users with the best service possible in a specific network configuration.

DETAILED DESCRIPTION OF PREFERRED EMBODIMENTS

Figure 1:
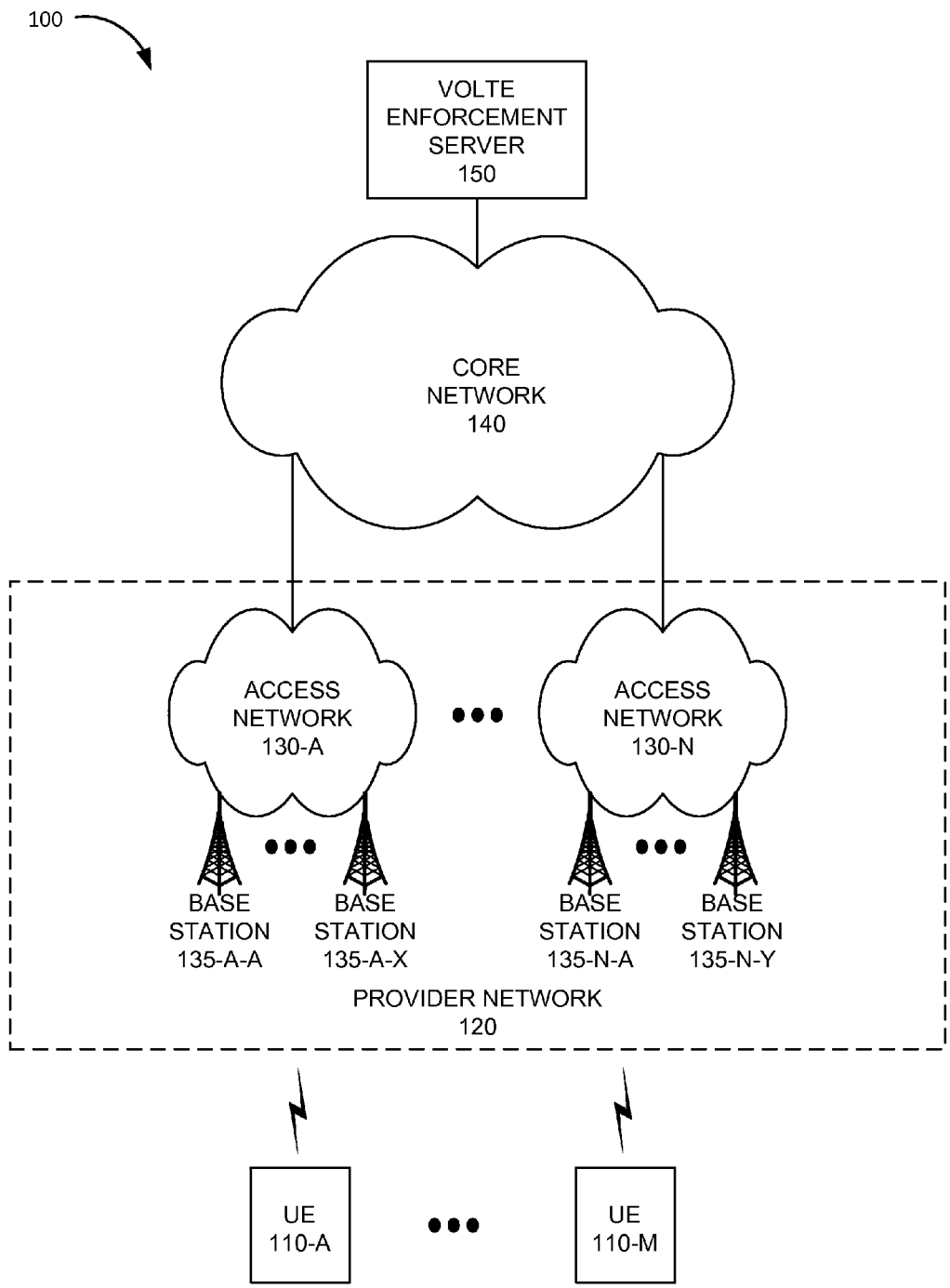
FIG. 1 is a diagram illustrating an environment according to an implementation described herein.

The following detailed description refers to the accompanying drawings. The same reference numbers in different drawings identify the same or similar elements.

A provider of wireless communication services may manage Long Term Evolution (LTE) wireless access networks (e.g., evolved packet core (EPC) networks) based on the LTE standard specified by the 3$^{rd}$ Generation Partnership Project (3GPP). An LTE wireless access network may include Voice over LTE (VoLTE) functionality. A VoLTE network or service may deliver voice service as data flows within an LTE data bearer. In other words, a VoLTE service provides a packet-switched connection for voice communications. Thus, a VoLTE enabled access network may not need to make use of legacy circuit-switched voice networks.

Because VoLTE is a relatively new service, wireless communication devices, such as mobile phones, may not be automatically enabled for VoLTE out of the box even if the device is provisioned to use VoLTE. In such cases, a wireless communication device may use a legacy voice technology such as a Code Division Multiple Access (CDMA) voice communication method for use with a CDMA access network. When the device activates a subscription with a provider of wireless communication services, the wireless communication device may attempt to use a CDMA access network for voice communication. If the provider does not provide CDMA service in a particular geographic area, the device switches to roaming by, for example, connecting to a legacy Single-Carrier Radio Transmission Technology (1×RTT) access network provided by a roaming partner of the provider. A roaming connection may incur unnecessary charges for the user of the device. Furthermore, a roaming or a non-roaming connection may cause blocking in an area with limited 1×RTT capability. Such problems may be avoided by activating and enabling VoLTE capability in the device when VoLTE service is available in the geographic area where the device is located, regardless of the VoLTE setting on the device.

Implementations described herein relate to an override of a device VoLTE setting triggered by a network notification. The wireless network may override the device settings of a wireless communication device to enable VoLTE in the wireless communication device when VoLTE service is available on the wireless network and non-VoLTE service is not desirable.

In some implementations, the provider may maintain a centralized VoLTE enforcement server device that includes a database of wireless access networks. For each wireless access network, the VoLTE enforcement server device may store information identifying which particular cells of the wireless access network are enabled for VoLTE service and in which particular cells non-VoLTE service is prohibited if VoLTE is available (e.g., in order to enforce VoLTE). When a wireless communication device attaches to a wireless access network, the wireless access network may instruct the wireless communication device to communicate with the VoLTE enforcement server device to determine whether the particular cell of the wireless access network, to which the wireless communication device has attached, has been designated as enabled for VoLTE service and/or prohibited for non-VoLTE service. If the wireless communication device is attached to a cell that is enabled for VoLTE service, the VoLTE enforcement server device may instruct the wireless communication device to enable VoLTE if the wireless communication device includes VoLTE capability.

In other implementations, a wireless network may broadcast a notification announcing the enforcement of VoLTE service in a particular geographic area. In some implementations, the notification may be based on a per-cell granularity, wherein particular transceivers of a base station may broadcast the notification based on whether a particular transceiver, associated with a particular cell, is in an area in which VoLTE needs to be enforced. In other implementations, the notification may be based on a more coarse granularity. As an example, the notification may be set for the transmission area of a base station. As another example, particular Mobility Management Entity (MME) devices may instruct base stations in a particular MME tracking area to broadcast a VoLTE service availability for the MME tracking area.

In some implementations, the notification may be generated by the wireless network by setting a particular bit or flag in a broadcast message. For example, a base station may send a message that includes a system information block 2 (SIB2) to a wireless communication device after an initial cell synchronization process between the wireless communication device and the base station is completed. The SIB2 may carry radio resource configuration information, such as random access channel (RACH) related parameters, idle mode paging configurations, uplink physical control channel (PUCCH) configurations, physical uplink shared channel (PUSCH) configurations, uplink power control and sounding reference signal configurations, uplink carrier frequency and/or bandwidth, cell barring information, and/or other types of configuration information.

In some implementations, the wireless access network may select and/or designate a bit or field in SIB2 to carry a notification about whether VoLTE service is available. The wireless access network may select a bit or field that is not used by the provider configurations. For example, if the provider does not use circuit switch fall back (CSFB), a bit or field designated to carry CSFB information may be designated to carry an indication of whether VoLTE service is available. In other implementations, a different type of bit or field may be used to carry the indication of whether VoLTE service is available.

In some implementations, the VoLTE service availability notification may be generated and transmitted by a base station (e.g., an eNodeB). In other implementations, a different element, such as an MME, of the wireless access network may generate the VoLTE service enforcement notification and may instruct an eNodeB to broadcast the generated VoLTE service enforcement notification. In some implementations, information relating to VoLTE service availability may be received by a device of the wireless network from a centralized VoLTE enforcement server.

The wireless access network may determine that VoLTE capability is enabled for a network segment (e.g., a cell, an eNodeB, an MME tracking area, etc.), may designate the network segment for VoLTE enforcement, may add an indication of VoLTE enforcement to a message information block (e.g., a SIB2), and may broadcast the message information block on the network segment.

A wireless communication device may receive the message information block from the wireless access network, may retrieve or identify the indication of VoLTE enforcement from the received information block, may determine that the wireless communication device is on the provider network, may activate VoLTE on the wireless communication device (if VoLTE is not already activated on the device), and may inform the user of the wireless communication device that VoLTE has been activated. The wireless communication device may, before activating VoLTE, check to make sure that the wireless communication device is enabled for VoLTE and/or may make sure that the wireless communication device is attached to a provider network associated with a subscription for the wireless communication device. Once VoLTE is activated, the wireless communication device may establish a VoLTE communication session with the wireless access network.

FIG. 1 is a diagram of an exemplary environment 100 in which the systems and/or methods, described herein, may be implemented. As shown in FIG. 1, environment 100 may include user equipment devices (UEs) 110-A to UE 110-M (referred to herein collectively as "UEs 110" and individually as "UE 110"), a provider network 120, a core network 140, and a VoLTE enforcement server 150.

Provider network 120 may provide wireless communication services for UEs 110. UE 110 may include a mobile communication device (e.g., a mobile phone, a smart phone, a phablet device, a wearable computer device (e.g., a head-mounted display computer device, a wristwatch computer device, etc.), a global positioning system (GPS) device, and/or another type of wireless device); a laptop computer, a tablet computer, or another type of portable computer; a media playing device; a portable gaming system; and/or any other type of mobile computer device with voice communication capabilities.

In some implementations, UE 110 may correspond to an embedded wireless device that communicates wirelessly with other devices over a machine-to-machine interface. For example, UE 110 may be electrically connected to any electronic device with a microcontroller, such as a microcontroller controlling one or more actuators, a microcontroller controlling one or more sensors, a microcontroller that performs data processing, and/or another type of microcontroller. Examples of such devices may include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), a device controlling a financial transaction system (e.g., a point-of-sale terminal, a vending machine, etc.), and/or another type of electronic device. UE 110 may include a Subscriber Identity Module (SIM) card (not shown in FIG. 1). The SIM card may store information for one or more subscriptions that may be activated for UE 110. UE 110 may wirelessly communicate with provider network 120.

Provider network 120 may be associated with a particular provider of communication services. Provider network 120 may include access networks 130-A to 130-N (referred to herein collectively as "access networks 130" and individually as "access network 130"). Access network 130 may provide access to core network 140 for wireless devices, such as UE 110. Access network 130 may enable UE 110 to provide mobile telephone service and/or data services to UE 110. Access network 130 may include base stations 135-A to 135-X (e.g., access network 130-A may include base stations 135-A-A to 135-A-X, access network 130-N may include base stations 135-N-A to 135-N-Y, etc.). UE 110 may wirelessly communicate with access network 130 via base station 135. Access network 130 may establish a packet data network connection between UE 110 and core network 140. For example, access network 130 may establish an Internet Protocol (IP) connection between UE 110 and core network 140. Access network 130 may include an LTE access network.

Core network 140 may include a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, the Internet, or a combination of networks. Core network 140 may allow the delivery of Internet Protocol (IP) services to UE 110, and may interface with other external networks. Core network 140 may include one or more server devices and/or network devices, or other types of computational or communication devices. In one examplary implementation, core network 140 may include an Internet Protocol Multimedia Subsystem (IMS) network (not shown in FIG. 1). An IMS network may include a network for delivering IP multimedia services as specified by 3GPP and may provide media flows between UE device 110 and external IP networks or external circuit-switched networks (not shown in FIG. 1).

VoLTE enforcement server 150 may include one or more devices, such as computer devices and/or server devices, which maintains a centralized database of wireless access networks 130 in provider network 120. VoLTE enforcement server 150 may, for particular wireless access networks 130, store information identifying which particular cells of the particular wireless access networks 130 are enabled for VoLTE service and in which particular cells non-VoLTE service is prohibited if VoLTE is available (e.g., in order to enforce VoLTE). UE 110 may communicate with VoLTE enforcement server 150 to determine whether a particular cell of access network 130, to which UE 110 has attached, has been designated enabled for VoLTE service and/or prohibited for non-VoLTE service. VoLTE enforcement server 150 may instruct UE 110 to enable VoLTE if UE 110 includes VoLTE capability and if UE 110 is attached to a cell of access network 130 that is enabled for VoLTE service.

Although FIG. 1 shows exemplary components of environment 100, in other implementations, environment 100 may include fewer components, different components, differently arranged components, or additional functional components than depicted in FIG. 1. Additionally or alternatively, one or more components of environment 100 may perform functions described as being performed by one or more other components of environment 100.

Figure 2:
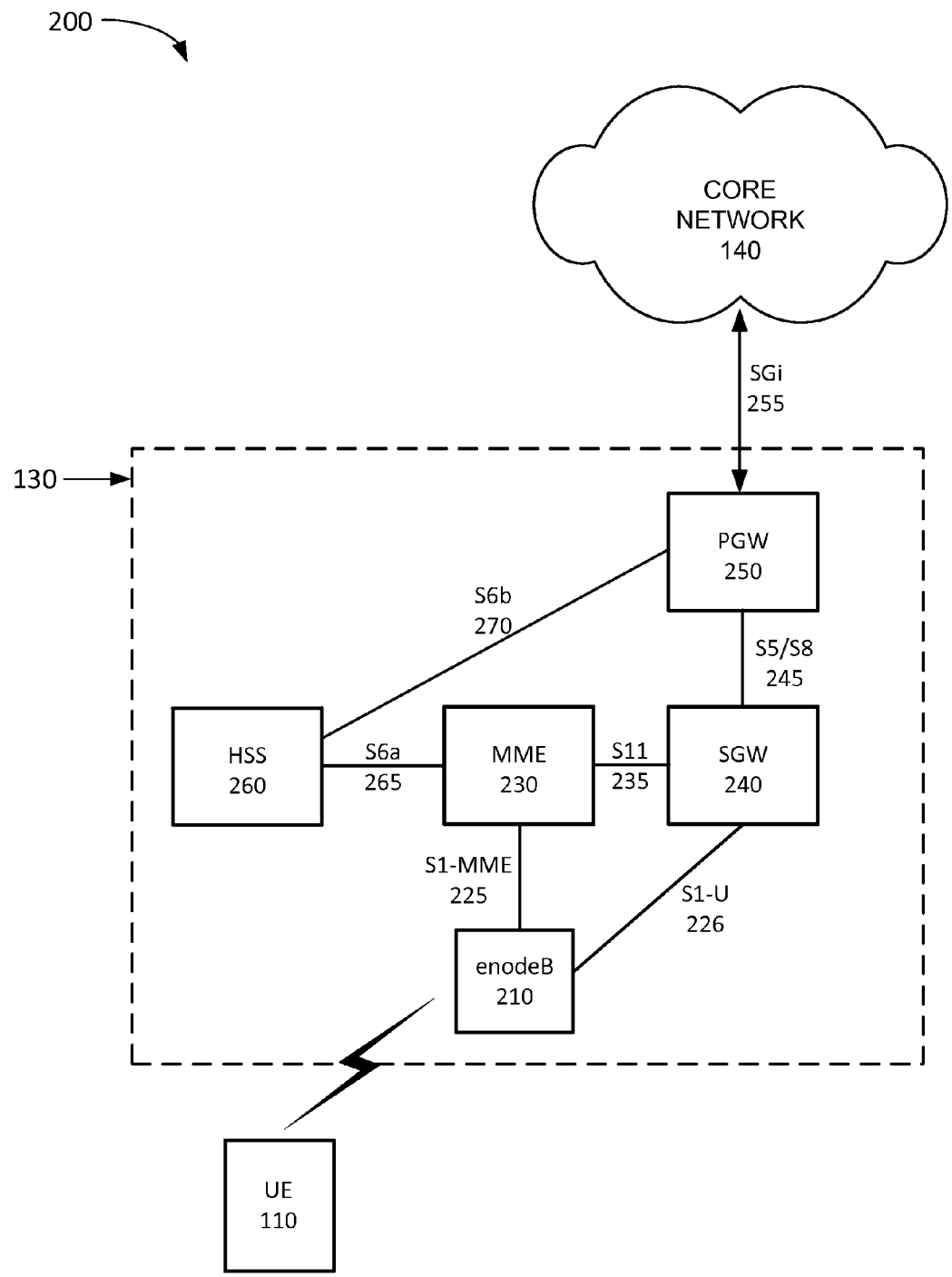
FIG. 2 is a diagram illustrating exemplary components of the access network of FIG. 1.

FIG. 2 is a diagram illustrating examplary components of a system 200 that includes access network 130 according to an implementation described herein. As shown in FIG. 2, system 200 may include UE 110, access network 130, and core network 140. Access network 130 may correspond to a Long Term Evolution (LTE) access network. Access network 130 may include one or more devices that implement logical entities interconnected via standardized interfaces, and that provide wireless packet-switched services and wireless IP connectivity to user devices for both data and voice services. Access network 130 may include eNodeB 210 (corresponding to base station 135), a mobility management entity (MME) 230, a serving gateway (SGW) 240, a packet data network gateway (PGW) 250, and a home subscriber server (HSS) 260. While FIG. 2 depicts a single eNodeB 210, MME 230, SGW 240, PGW 250, and HSS 260 for illustration purposes, in other implementations, FIG. 2 may include multiple eNodeBs 210, MMEs 230, SGWs 240, PGWs 250, and/or HSSes 260.

eNodeB 210 may include one or more devices (e.g., base stations) and other components and functionality that allow UE 110 to wirelessly connect to access network 130. eNodeB 210 may include or be associated with one or more cells. For example, each cell may include a radio frequency (RF) transceiver facing a particular direction. eNodeB 210 may interface with access network 130 via an interface referred to as an S1 interface, which may be split into a control plane S1-MME interface 225 and a data plane S1-U interface 226. S1-MME interface 225 may interface with MME device 230. S1-MME interface 225 may be implemented, for example, with a protocol stack that includes a Network Access Server (NAS) protocol and/or Stream Control Transmission Protocol (SCTP). An S1-U interface 226 may interface with SGW 240 and may be implemented, for example, using a General Packet Radio Service Tunneling Protocol version 2 (GTPv2).

MME 230 may implement control plane processing for access network 130. For example, MME 230 may implement tracking and paging procedures for UE 110, may activate and deactivate bearers for UE 110, may authenticate a user of UE 110, and may interface to non-LTE radio access networks. A bearer may represent a logical channel with particular quality of service (QoS) requirements. MME 230 may also select a particular SGW 240 for a particular UE 110. A particular MME 230 may interface with other MMEs 230 in access network 130 and may send and receive information associated with UEs 110, which may allow one MME device to take over control plane processing of UEs serviced by another MME, if the other MME becomes unavailable.

SGW 240 may provide an access point to and from UE 110, may handle forwarding of data packets for UE 110, and may act as a local anchor point during handover procedures between eNodeBs 210. SGW 240 may interface with PGW 250 through an S5/S8 interface 245. S5/S8 interface 245 may be implemented, for example, using GTPv2.

PGW 250 may function as a gateway to core network 140 through an SGi interface 155. Core network 140 may include, for example, an IMS network, which may provide voice and multimedia services to UE 110, based on Session Initiation Protocol (SIP). A particular UE 110, while connected to a single SGW 240, may be connected to multiple PGWs 250, one for each packet network with which UE 110 communicates.

MME 230 may communicate with SGW 240 through an S11 interface 235. S11 interface 235 may be implemented, for example, using GTPv2. S11 interface 235 may be used to create and manage a new session for a particular UE 110. S11 interface 235 may be activated when MME 230 needs to communicate with SGW 240, such as when the particular UE 110 attaches to access network 130, when bearers need to be added or modified for an existing session for the particular UE 110, when a connection to a new PGW 250 needs to be created, or during a handover procedure (e.g., when the particular UE 110 needs to switch to a different SGW 240).

HSS 260 may store information associated with UEs 110 and/or information associated with users of UEs 110. For example, HSS 260 may store user profiles that include authentication and access authorization information. MME 230 may communicate with HSS 260 through an S6a interface 265. S6a interface 265 may be implemented, for example, using a Diameter protocol. PGW device 250 may communicate with HSS device 260 through an S6b interface 270. S6b interface 270 may be implemented, for example, using a Diameter protocol.

Although FIG. 2 shows exemplary components of access network 130, in other implementations, access network 130 may include fewer components, different components, differently arranged components, or additional components than depicted in FIG. 2. Additionally or alternatively, one or more components of access network 130 may perform functions described as being performed by one or more other components of access network 130.

Figure 3:
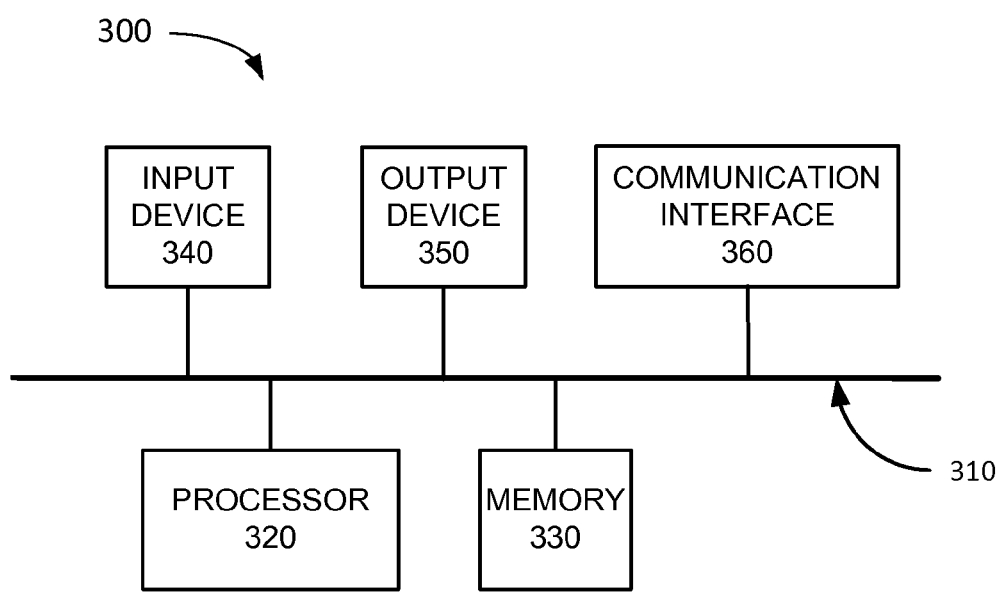
FIG. 3 is a diagram illustrating exemplary components of one or more of the devices of FIG. 1 or FIG. 2.

FIG. 3 is a diagram illustrating exemplary components of device 300 according to an implementation described herein. VoLTE enforcement server 150, MME 230, SGW 240, PGW 250, and/or HSS 260 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to RF signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to a maintaining and/or broadcasting information relating to the VoLTE capabilities of a particular access network 130 and/or VoLTE enforcement. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally or alternatively, one or more components of device 300 may perform one or more tasks described as being performed by one or more other components of device 300.

Figure 4A:
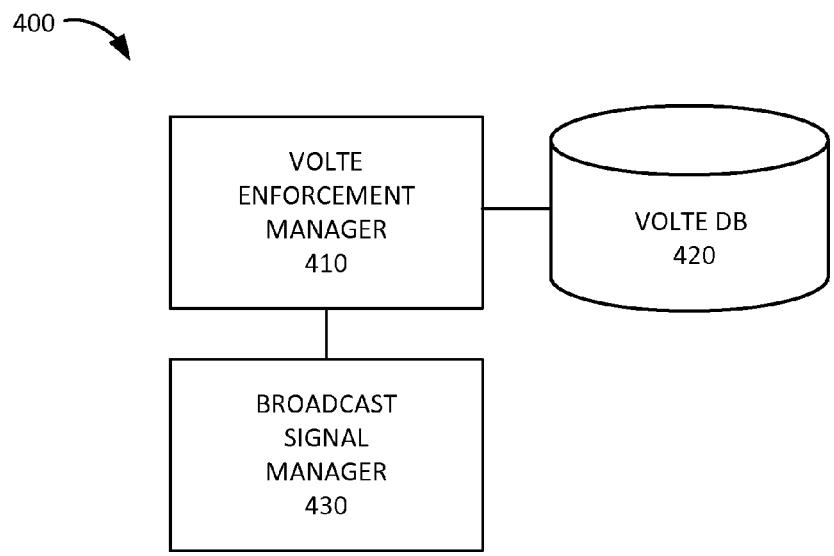
FIG. 4A is a diagram illustrating exemplary functional components of one or more of the devices of FIG. 1 or FIG. 2.

FIG. 4A is a diagram illustrating device 400 that includes exemplary functional components implemented in VoLTE enforcement server 150, MME 230, SGW 240, PGW 250, and/or eNodeB 210. The functional components of VoLTE enforcement server 150, MME 230, SGW 240, and/or PGW 250 may be implemented, for example, via processor 320 executing instructions from memory 330 (or via processing unit 510 of FIG. 5 discussed below executing instructions from memory 520 if device 400 is included in eNodeB 210). Alternatively, some or all of the functional components included in system 400 may be implemented via hard-wired circuitry. As shown in FIG. 4A, device 400 may include a VoLTE enforcement manager 410, a VoLTE database (DB) 420, and a broadcast signal manager 430.

VoLTE enforcement manager 410 may determine whether access network 130, or particular cells of access network 130, are configured for VoLTE service and may store information relating to VoLTE service in VoLTE DB 420. VoLTE enforcement manager 410 may obtain information relating to VoLTE service by receiving the information via manual input from an administrator, by communicating with a network management system that includes information for access networks 130 of provider network 120, by querying particular access networks 130 of provider network 120, by collecting information relating to voice communication sessions in particular access networks 130, and/or using other techniques.

VoLTE DB 420 may store VoLTE service information for different network segments of access network 130. Exemplary information that may be stored in VoLTE DB 420 is described below with reference to FIG. 4B.

Broadcast signal manager 430 may broadcast information relating to VoLTE enforcement. As an example, if device 400 is included in VoLTE enforcement server 150, broadcast signal manager 430 may send an indication that VoLTE capability is enabled for a network segment of a particular access network 130 to the particular access network 130. As another example, if device 400 is included in eNodeB 210, MME 230, and/or another device of access network 130, broadcast signal manager 430 may incorporate an indication of VoLTE enforcement into a message information block and may broadcast the message information block to UEs 110 within the transmission range of access network 130. The message information block may include a SIB2 message in which a bit of field has been set to carry a notification about whether VoLTE should be enabled. The bit or field may correspond to a bit or field that is not used, or not typically used, by the provider configurations, such as a CSFB bit.

Although FIG. 4A shows exemplary components of system 400, in other implementations, system 400 may include fewer components, different components, additional components, or differently arranged components than depicted in FIG. 4A. Additionally or alternatively, one or more components of system 400 may perform one or more tasks described as being performed by one or more other components of system 400.

Figure 4B:
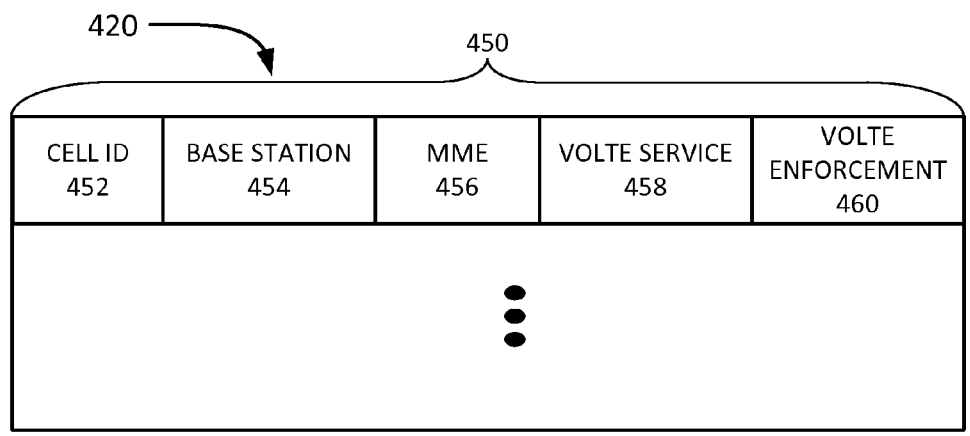
FIG. 4B is a diagram illustrating exemplary components that may be stored in the Voice over Long Term Evolution (VoLTE) database of FIG. 4A.

FIG. 4B is a diagram illustrating exemplary components that may be stored in VoLTE DB 420. As shown in FIG. 4B, VoLTE DB 420 may include one or more cell records 450. If device 400 of FIG. 4A is included in VoLTE enforcement server 150, device 400 may include a VoLTE DB 420 for each access network 130 included in provider network 120. Each cell record 450 may store information relating to a particular cell of a base station 135 (e.g., eNodeB 210). Cell record 450 may include a cell identifier (ID) field 452, a base station field 454, a MME field 456, a VoLTE service field 458, and a VoLTE enforcement field 460.

Cell ID field 452 may store information identifying a particular cell of access network 130. For example, each eNodeB 210 may control up to 256 cells. Each cell may be associated with an RF transceiver pointed, or configured to transmit, in a particular direction and/or service a particular transmission area. Base station field 454 may identify a particular base station 135 (e.g., eNodeB 210) associated with the particular cell. MME field 456 may identify a particular MME 230 associated with the base station associated with the particular cell. VoLTE service field 458 may include information identifying whether the particular cell has been enabled for VoLTE service. VoLTE enforcement field 460 may include information identifying whether VoLTE enforcement is activated for the particular cell. Some cells may be enabled for VoLTE service and may not be designated for VoLTE enforcement. For example, a cell may have been recently enabled for VoLTE and may be undergoing testing. If VoLTE enforcement field 460 indicates that VoLTE enforcement is in place, broadcast signal manager 430 may incorporate an indication of VoLTE enforcement into a message information block and may broadcast the message information block to UEs 110 within the transmission range of the particular cell. VoLTE enforcement may be set for particular cells, for groups of cells (e.g., all cells of eNodeB 210), for groups of base stations (e.g., all eNodeBs 210 assigned to the tracking area of a particular MME 23), and/or set for network segments defined by other criteria.

Although FIG. 4B shows exemplary components of VoLTE DB 420 or information stored in VoLTE DB 420, in other implementations, VoLTE DB 420 may include fewer components, different components, additional components, or differently arranged components, or store different information, than depicted in FIG. 4B.

Figure 5:
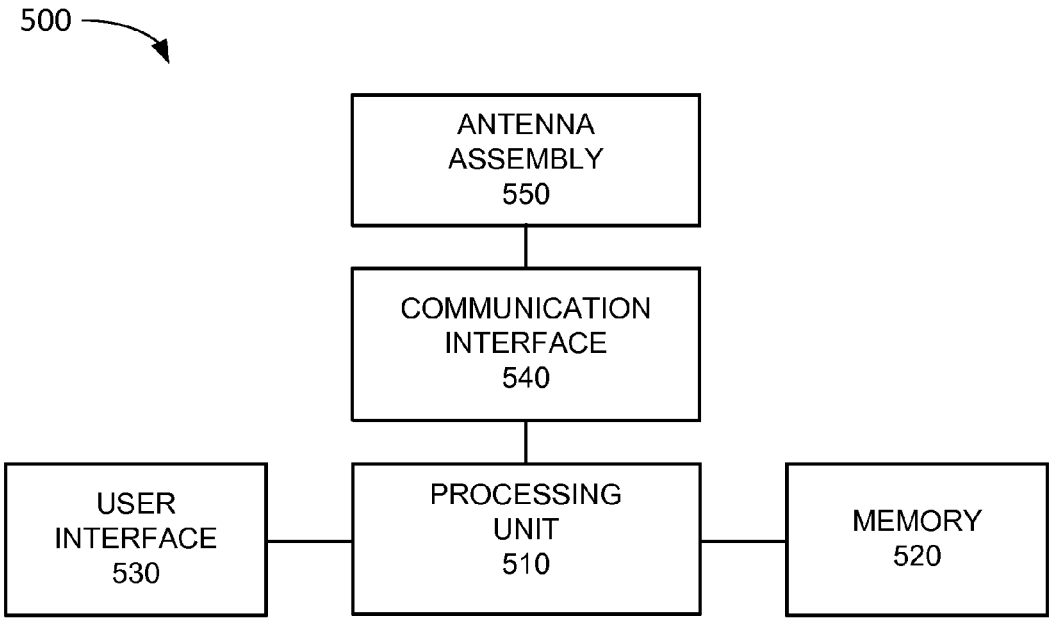
FIG. 5 is a diagram illustrating exemplary components of the user equipment of FIG. 1 or of the eNodeB 210 of FIG. 2.

FIG. 5 is a diagram illustrating examplary components of a device 500 according to an implementation described herein. UE 110 and/or eNodeB 210 may each include one or more devices 500. As shown in FIG. 5, device 500 may include a processing unit 510, a memory 520, a user interface 530, a communication interface 540, and an antenna assembly 550.

Processing unit 510 may include one or more processors, microprocessors, application specific integrated circuits (ASICs), field programmable gate arrays (FPGAs), and/or other processing logic. Processing unit 510 may control operation of device 500 and its components.

Memory 520 may include a random access memory (RAM) or another type of dynamic storage device, a read only memory (ROM) or another type of static storage device, a removable memory card, and/or another type of memory to store data and instructions that may be used by processing unit 510.

User interface 530 may allow a user to input information to device 500 and/or to output information from device 500. Examples of user interface 530 may include a speaker to receive electrical signals and output audio signals; a camera to receive image and/or video signals and output electrical signals; a microphone to receive sounds and output electrical signals; buttons (e.g., a joystick, control buttons, a keyboard, or keys of a keypad) and/or a touchscreen to receive control commands; a display, such as an LCD, to output visual information; an actuator to cause device 500 to vibrate; and/or any other type of input or output device.

Communication interface 540 may include a transceiver that enables UE 110 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 540 may include a transmitter that converts baseband signals to radio frequency (RF) signals and/or a receiver that converts RF signals to baseband signals. Communication interface 540 may be coupled to antenna assembly 550 for transmitting and receiving RF signals.

Communication interface 540 may include a logical component that includes input and/or output ports, input and/or output systems, and/or other input and output components that facilitate the transmission of data to other devices. For example, communication interface 540 may include a network interface card (e.g., Ethernet card) for wired communications and/or a wireless network interface (e.g., a WiFi) card for wireless communications. Communication interface 540 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Antenna assembly 550 may include one or more antennas to transmit and/or receive RF signals. Antenna assembly 550 may, for example, receive RF signals from communication interface 540 and transmit the signals and receive RF signals and provide them to communication interface 540.

As described herein, device 500 may perform certain operations in response to processing unit 510 executing software instructions contained in a computer-readable medium, such as memory 520. A computer-readable medium may be defined as a non-transitory memory device. A non-transitory memory device may include memory space within a single physical memory device or spread across multiple physical memory devices. The software instructions may be read into memory 520 from another computer-readable medium or from another device via communication interface 540. The software instructions contained in memory 520 may cause processing unit 510 to perform processes that will be described later. Alternatively, hard-wired circuitry may be used in place of, or in combination with, software instructions to implement processes described herein. Thus, implementations described herein are not limited to any specific combination of hardware circuitry and software.

Although FIG. 5 shows example components of device 500, in other implementations, device 500 may include fewer components, different components, differently arranged components, or additional components than depicted in FIG. 5. Additionally or alternatively, one or more components of device 500 may perform the tasks described as being performed by one or more other components of device 500.

Figure 6:
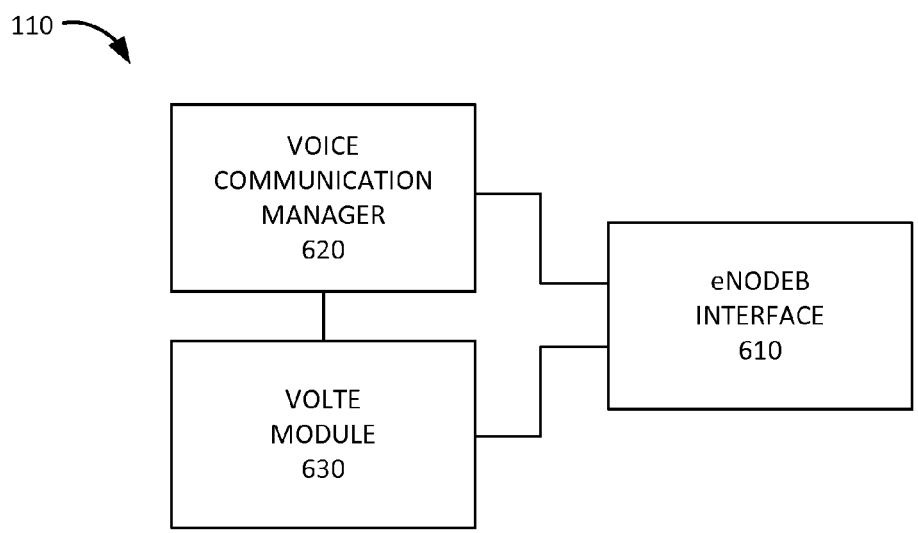
FIG. 6 is a diagram illustrating exemplary functional components of the user equipment of FIG. 1.

FIG. 6 is a diagram illustrating exemplary functional components of UE 110 according to an implementation described herein. The functional components of UE 110 may be implemented, for example, via processing unit 510 executing instructions from memory 520. Alternatively, some or all of the functional components of UE 110 may be implemented via hard-wired circuitry. As shown in FIG. 6, UE 110 may include an eNodeB interface 610, a voice communication manager 620, and a VoLTE module 630.

eNodeB interface 610 may be configured to communicate with eNodeB 210. eNodeB interface 610 may receive a message information block from eNodeB 210 and may provide the message information block to voice communication manager 620.

Voice communication manager 620 may select a particular voice communication method for UE 110. Voice communication manager 620 may retrieve a notification from the message information block that access network 130 is configured for VoLTE service. Voice communication manager 620 may determine that UE 110 is configured for VoLTE (e.g., based on the presence of VoLTE module 630). Additionally, in some implementations, voice communication manager 620 may determine whether UE 110 is communicating with an access network 130 that is part of provider network 120 before activating VoLTE module 630. Voice communication manager 620 may then, based on retrieving the notification, activate VoLTE module 630. VoLTE module 630 may, once activated, enable UE 110 to use a VoLTE service.

Although FIG. 6 shows exemplary functional components of UE 110, in other implementations, UE 110 may include fewer functional components, different functional components, differently arranged functional components, or additional functional components than depicted in FIG. 6. Additionally or alternatively, one or more functional components of UE 110 may perform functions described as being performed by one or more other functional components of UE 110.

Figure 7:
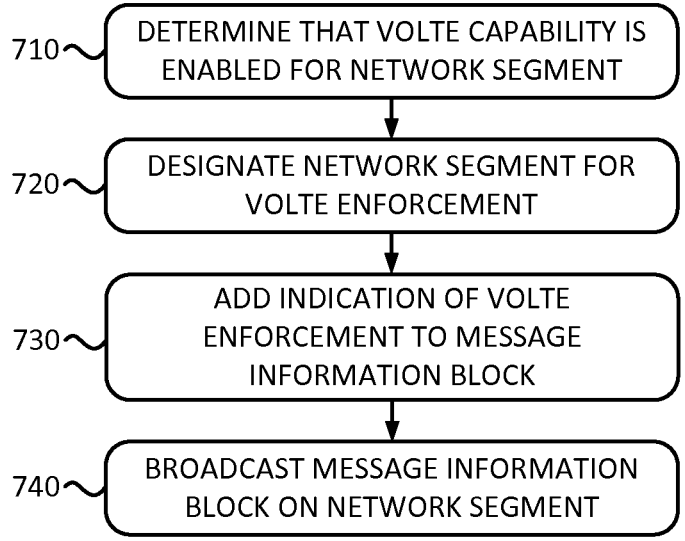
FIG. 7 is a flowchart of an exemplary process performed by an element of a wireless access network according to an implementation described herein.

FIG. 7 is a flowchart of an exemplary process performed by an element of a wireless access network according to an implementation described herein. In some implementations, the process of FIG. 7 may be performed by eNodeB 210, MME 230, SGW 240, and/or PGW 250. In other implementations, some or all of the process of FIG. 7 may be performed by another device or a group of devices separate from eNodeB 210, MME 230, SGW 240, and/or PGW 250 or including eNodeB 210, MME 230, SGW 240, and/or PGW 250.

As shown in FIG. 7, access network 130 may determine that VoLTE capability is enabled for a network segment and should be enforced (e.g., a cell, an eNodeB, an MME tracking area, etc.) (block 710) and may designate the network segment for VoLTE enforcement (block 720). For example, in some implementations, if device 400 is included in VoLTE enforcement server 150, VoLTE enforcement manager 410 may include information identifying which cells of access network 130 are designated for VoLTE enforcement in VoLTE DB 420 and access network 130 may instruct UE 110 via a set bit or field in SIB2 (or another type of message information block) to contact VoLTE enforcement manager 410 to determine whether UE 110 should activate VoLTE when attached to a particular cell of access network 130. In other implementations, VoLTE enforcement server 150 may send information to access network 130 indicating which cells, base stations 135, tracking areas, and/or other types of network segments are designated for VoLTE enforcement and access network 130 may store the information in a locally managed VoLTE DB 420 (e.g., maintained by MME 230, eNodeB 210, etc.). In yet other implementations, environment 100 may not include VoLTE enforcement server 150 and access network 130 may designate network segments for VoLTE enforcement in a VoLTE DB 420 maintained by access network 130.

An indication of VoLTE enforcement may be added to a message information block (block 730) and the message information block may be broadcast on a network segment (block 740). For example, a particular RF transceiver of a particular cell of eNodeB 210 in access network 130 may set a bit or field in a message information block and transmit the message information block via wireless signals to UEs 110 within the transmission range of the RF transceiver. In some implementations, broadcast signal manager 430 of eNodeB 210 (or of VoLTE enforcement server 150) may set a CSFB bit (otherwise unused by provider network 120) in a SIB2 message that is broadcast to UEs 110 within the transmission range. In other implementations, broadcast signal manager 430 of eNodeB 210 may set a different bit or field in a SIB2 message that is otherwise unused by provider network 120.

Figure 8:
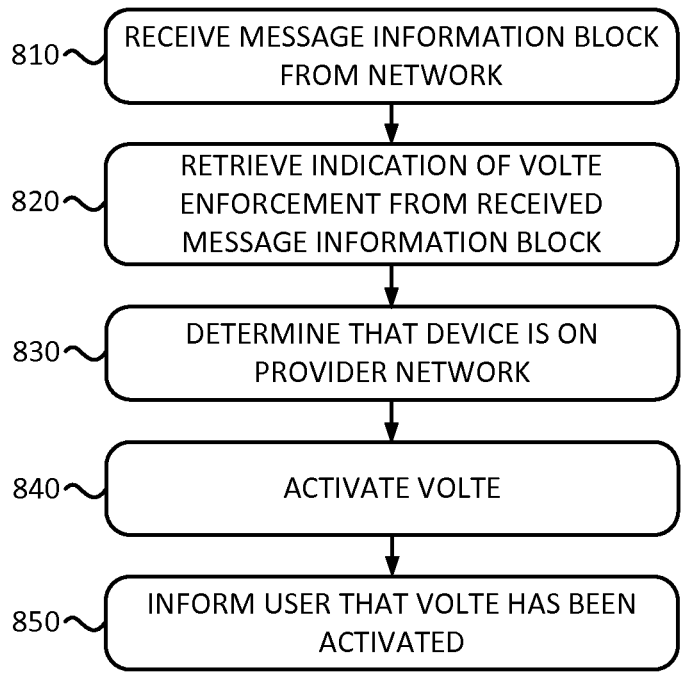
FIG. 8 is a flowchart of an exemplary process performed by a user equipment according to an implementation described herein.

FIG. 8 is a flowchart of an exemplary process performed by UE 110 according to an implementation described herein. In some implementations, the process of FIG. 8 may be performed by UE 110. In other implementations, some or all of the process of FIG. 8 may be performed by another device or a group of devices separate from UE 110 or including UE 110.

As shown in FIG. 8, UE 110 may receive the message information block from access network 130 (block 810) and may retrieve or identify the indication of VoLTE enforcement from the received message information block (block 820). For example, eNodeB interface 610 may receive a SIB2 message from eNodeB 210 and voice communication manager 620 may be configured to determine whether a CSFB bit (otherwise unused by provider network 120) has been set to indicate VoLTE enforcement on the cell from which the SIB2 message has been received.

UE 110 may retrieve information from SIB2 during an attempt to establish a Radio Resource Control (RRC) connection with eNodeB 210. During the attempt, UE 110 may perform an access barring check to determine whether access is barred for UE 110 to connect to eNodeB 210. For example, access barring may be used to give some UEs 110 a higher priority to connect to eNodeB 210, such as UEs 110 associated with emergency services, staff personnel for provider network 120, public utilities, etc. If access to eNodeB 210 is barred for UE 110, UE 110 may resort to a CSFB to use a legacy circuit switched connection for making voice calls. If CSFB is not used by provider network 120, UE 110 may be configured to activate VoLTE if an ac-BarringForCSFB field is set. In other implementations, a different field of SIB2, or of another SIB (e.g., SIB1, SIB3, SIB4, etc.) may be set and UE 110 may be configured to check the designated bit or field to check for VoLTE enforcement.

A determination may be made that the device is on a provider network (block 830). For example, voice communication manager 620 may be configured to determine that UE 110 has VoLTE capability and that UE 110 is on provider network 120 before activating VoLTE. For example, voice communication manager 620 may check an identifier associated with access network 130 against a list of access network identifiers associated with provider network 120 that is stored on a SIM card included in UE 110. If VoLTE capacity is present and UE 110 is connected to provider network 120, VoLTE may be activated (block 840) and the user may be informed that VoLTE has been activated (block 850). For example, voice communication manager 620 may activate VoLTE module 630 and VoLTE module 630 may display a message via user interface 530 to inform the user that VoLTE capability has been activated.

Figure 9:
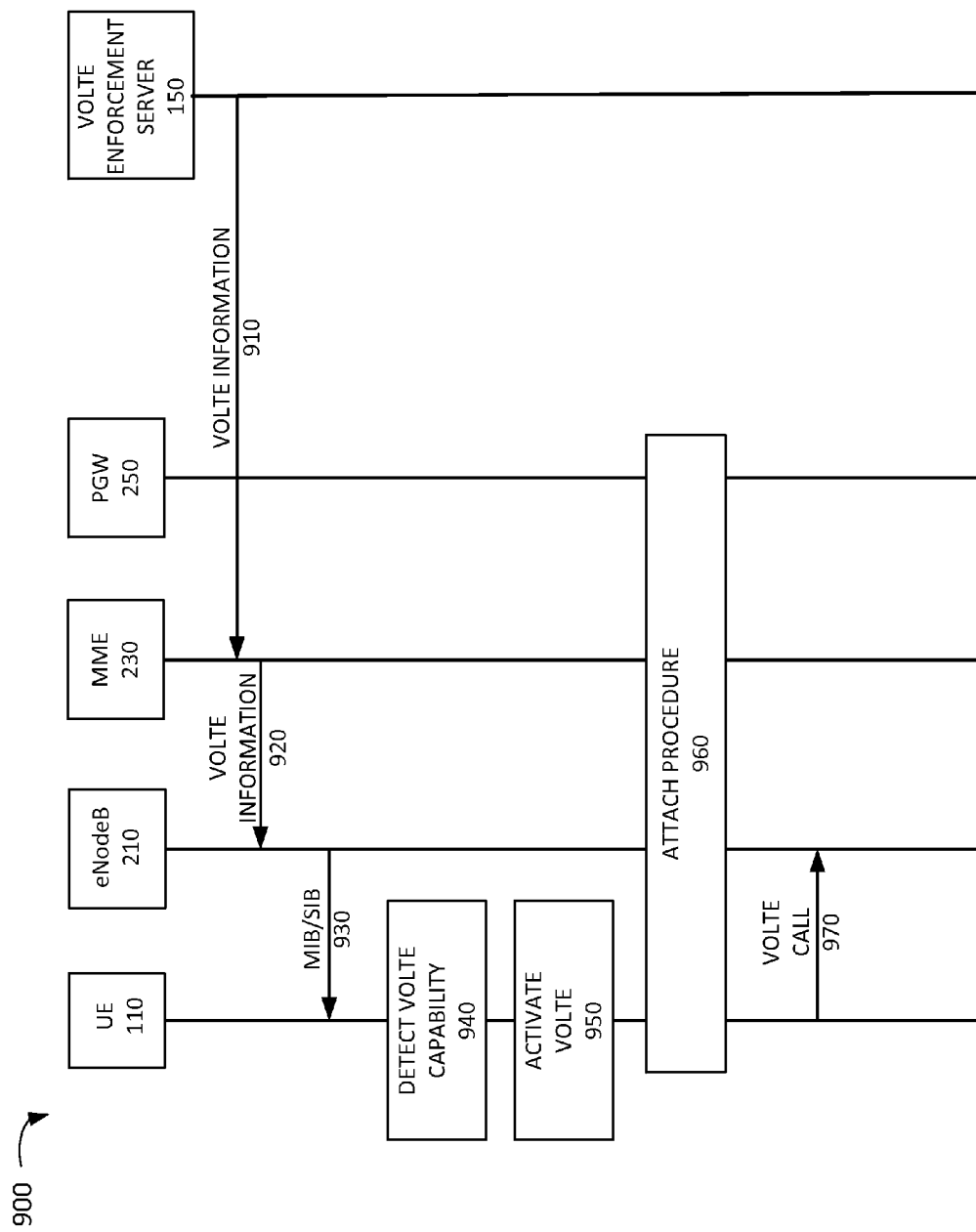
FIG. 9 is an exemplary signal flow diagram according to an implementation described herein.

FIG. 9 is an exemplary signal flow diagram 900 according to an implementation described herein. As shown in FIG. 9, flow diagram 900 may include VoLTE enforcement server 150 sending VoLTE information to eNodeB 210 via MME 230 (signals 910 and 920). The VoLTE information may identify which cell of eNodeBs 210 in access network 130 have been enabled for VoLTE and designated for VoLTE enforcement. MME 230 may send an instruction to eNodeBs 210 that include cells with designated VoLTE enforcement to broadcast an indication of VoLTE enforcement.

eNodeB 210, or particular cells of eNodeB 210, may set a bit in a message information block (MIB) based on the instruction from MME 230 to enforce VoLTE. For example, eNodeB 210 may set a CSFB bit in a SIB2 message (or a SIB1 message, or a different type of SIB message, etc.) and may broadcast the SIB2 message (signal 930). Alternatively, eNodeB 210 may send a different message (e.g., control message) indicating that VoLTE enforcement is to be followed. When UE 110 powers up, UE 110 may attempt to detect a SIB2 message from nearby cell stations. If UE 110 picks eNodeB 210 (e.g., based on signal strength), UE 110 may decode the received SIB2 message and may be configured to check for VoLTE enforcement. UE 110 may detect that it has VoLTE capability (block 940) and may, in response, activate VoLTE (block 950). UE 110 may then attach to access network 130, which includes eNodeB 210, MME 230, and PGW 250, using an attach procedure (block 960). Once the attach procedure is completed and resources have been reserved by access network 130 for UE 110, UE 110 may request a connection for a VoLTE call (signal 970).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

As an example, while series of blocks have been described with respect to FIGS. 7 and 8, and a series of signal flows and blocks has been described with respect to FIG. 9, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a device of a wireless access network, the method comprising:

determining, by the device, that Voice over Long Term Evolution (VoLTE) capability is enabled for a network segment of the wireless access network;

designating, by the device, the network segment for VoLTE enforcement;

adding, by the device, an indication of VoLTE enforcement to a message information block in response to designating the network segment for VoLTE enforcement, wherein the indication of VoLTE enforcement causes User Equipment (UE) devices that receive the message information block to activate VoLTE, and wherein adding the indication of VoLTE enforcement includes setting a bit in the message information block, wherein the bit is designated for a function that is not used by a provider associated with the wireless access network; and transmitting, by the device, the message information block on the network segment.

2. The method of claim 1, wherein the message information block includes a Long Term Evolution (LTE) system information block 2 (SIB2).

3. The method of claim 1, wherein the bit corresponds to a circuit switch fallback bit.

4. The method of claim 1, wherein determining that VoLTE capability is enabled for the network segment of the wireless access network includes:

accessing a VoLTE database that stores VoLTE service information for different network segments of the wireless access network.

5. The method of claim 1, wherein the device of the wireless access network includes at least one of an eNodeB device or a Mobility Management Entity device.

6. The method of claim 1, wherein determining that VoLTE capability is enabled for the network segment of the wireless access network includes:

receiving an indication that VoLTE capability is enabled for the network segment of the wireless access network from a VoLTE enforcement server that maintains VoLTE capability information for the wireless access network.

7. The method of claim 1, wherein the network segment corresponds to a cell of a base station.

8. The method of claim 1, wherein the network segment corresponds to a transmission area associated with a base station.

9. The method of claim 1, wherein the network segment corresponds to a tracking area associated with a Mobility Management Entity device.

10. A device of a wireless access network, the device comprising:

a logic configured to:

determine that Voice over Long Term Evolution (VoLTE) capability is enabled for a network segment of the wireless access network;

designate the network segment for VoLTE enforcement;

add an indication of VoLTE enforcement to a message information block in response to designating the network segment for VoLTE enforcement, wherein the indication of VoLTE enforcement causes User Equipment (UE) devices that receive the message information block to activate VoLTE, and wherein adding the indication of VoLTE enforcement includes setting a bit in the message information block, wherein the bit is designated for a function that is not used by a provider associated with the wireless access network; and transmit the message information block on the network segment.

11. The device of claim 10, wherein the message information block includes a Long Term Evolution (LTE) system information block 2 (SIB2).

12. The device of claim 10, wherein the bit corresponds to a circuit switch fallback bit.

13. The device of claim 10, wherein the logic configured to determine that VoLTE capability is enabled for the network segment of the wireless access network further includes:

logic configured to receive an indication that VoLTE capability is enabled for the network segment of the wireless access network from a VoLTE enforcement server that maintains VoLTE capability information for the wireless access network.

14. The device of claim 10, wherein the network segment corresponds to:

a cell of a base station;

a transmission area associated with a base station; or a tracking area associated with a Mobility Management Entity device.

15. A method, performed by a wireless communication device, the method comprising:

receiving, by the wireless communication device, a message information block from a wireless access network;

identifying, by the wireless communication device, and based on the received message information block, an indication that the wireless access network includes Voice over Long Term Evolution (VoLTE) enforcement;

determining, by the wireless communication device, whether the wireless access network corresponds to a provider network associated with an access network identifier stored in a Subscriber Identity Module (SIM) card associated with the wireless communication device; and activating, by the wireless communication device, VoLTE calling on the wireless communication device, in response to identifying the indication that the wireless access network includes VoLTE enforcement and based on determining that the wireless access network corresponds to the provider network associated with the access network identifier stored in the SIM card associated with the wireless communication device.

16. The method of claim 15, further comprising:

determining that the wireless communication device is enabled for VoLTE; and wherein activating VoLTE calling on the wireless communication device is based on determining that the wireless communication device is enabled for VoLTE.

17. The method of claim 15, further comprising:

receiving a request, via a user interface, to initiate a voice communication session; and sending a request to establish a VoLTE session to the wireless access network, in response to receiving the request to initiate the voice communication session.

18. The device of claim 10, wherein when determining that VoLTE capability is enabled for the network segment of the wireless access network, the logic is further configured to:

access a VoLTE database that stores VoLTE service information for different network segments of the wireless access network.

19. The method of claim 15, wherein the message information block includes a Long Term Evolution (LTE) system information block 2 (SIB2).

20. The method of claim 15, wherein identifying the indication that the wireless access network includes VoLTE enforcement includes:

accessing a circuit switch fallback bit in the message information block.

* * * * *